United States Patent [19]

Takano

[11] 4,442,505

[45] Apr. 10, 1984

[54] CONTROL DEVICE OF COPYING MACHINE

[75] Inventor: Shouji Takano, Kawasaki, Japan

[73] Assignee: Tokyo Shibaura Denki Kabushiki Kaisha, Kawasaki, Japan

[21] Appl. No.: 323,557

[22] Filed: Nov. 20, 1981

[30] Foreign Application Priority Data

Nov. 28, 1980 [JP] Japan ................................ 55-167436

[51] Int. Cl.³ ........................ G06F 9/06; G03G 15/00

[52] U.S. Cl. .................................. 364/900; 355/14 R

[58] Field of Search ... 364/200 MS File, 900 MS File, 364/200, 900; 355/14 R

[56] References Cited

U.S. PATENT DOCUMENTS 4,158,886 6/1979 Gray et al. ...................... 364/900 X
4,196,476 4/1980 Steiner ................................ 364/900
4,213,190 7/1980 Finlay et al. ........................ 364/900
4,275,958 6/1981 Tachika et al. .................. 355/14 R

FOREIGN PATENT DOCUMENTS 54-44542 4/1979 Japan .

*Primary Examiner*—Harvey E. Springborn
*Attorney, Agent, or Firm*—Cushman, Darby & Cushman

[57] ABSTRACT

A copying machine has a microcomputer which is capable of actuating a plurality of processing components, including an automatic document feeder, a semi-automatic document feeder and a sorter, to continuously perform automatic copying with time sequence. This microcomputer has a random access memory. In the random access memory (RAM) are stored a series of programs for continuous copying specified at a keyboard by a user, that is, copying conditions such as a copying sheet number, modes of enlarged copying, reduced copying and copying of equal size, selection of an outfeed position of the sorter, selection of the automatic document feeder or the semi-automatic document feeder, and changes in paper sizes. The microcomputer controls respective components of the copying machine so as to perform continuous copying in response to the program stored in the RAM.

3 Claims, 18 Drawing Figures

| STATUS OF MODE SELECTION SWITCH | BINARY CODE | CONTROL MODE OF COPYING MACHINE |
|---|---|---|
| 1 | 0 0 0 | NORMAL COPYING MODE |
| 2 | 0 0 1 | KEY COUNTER MODE |
| 3 | 0 1 0 | RAM READ MODE I |
| 4 | 0 1 1 | RAM READ MODE II |
| 5 | 1 0 0 | RAM WRITE MODE |

F I G. 6

| | ADDRESS | CONTENTS OF STORAGE | |
|---|---|---|---|
| 275 | n | PROGRAM START CODE | 279 |
| | n + 1 | COPYING SHEET NUMBER | 283 |
| | n + 2 | INSTRUCTION CODE | 285 |
| | n + 3 | COPYING SHEET NUMBER | |
| | n + 4 | INSTRUCTION CODE | |
| | ≈ | ≈ | |
| | m | PROGRAM END CODE | 281 |
| | m + 1 | PROGRAM START CODE | |
| | m + 2 | COPYING SHEET NUMBER | |
| | m + 3 | INSTRUCTION CODE | |
| | ≈ | ≈ | |
| | K | PROGRAM END CODE | |
| | | | |
| | ≈ | ≈ | |
| 277 | ℓ | PROGRAM NAME CODE | 287 |
| | ℓ + 1 | START ADDRESS (n) | 289 |
| | ℓ + 2 | PROGRAM NAME CODE | |
| | ℓ + 3 | START ADDRESS (m + 1) | |

FIG. 7

| SEQUENCE | CONTENTS TO BE WRITTEN | |
|---|---|---|
| 1 | COPYING SHEET NUMBER (h) | 291 |
| 2 | A4 SIZE SELECTION INSTRUCTION CODE | 293 |
| 3 | COPYING SHEET NUMBER (i) | 295 |
| 4 | B5 SIZE SELECTION INSTRUCTION CODE | 297 |
| 5 | COPYING SHEET NUMBER (j) | 299 |
| 6 | SHEET FEEDING UNIT DESIGNATION CODE (ADF OR SDF) | 301 |
| 7 | COPYING SHEET NUMBER (k) | 303 |
| 8 | TWICE COPYING INSTRUCTION CODE | 305 |
| 9 | COPYING SHEET NUMBER (ℓ) | 307 |
| 10 | DELIVERY-TO-SORTER INSTRUCTION CODE | 309 |

CONTROL DEVICE OF COPYING MACHINE

BACKROUND OF THE INVENTION

The present invention relates to a control device of an electronic copying machine which continuously and automatically copies a document having a plurality of sheets.

In general, an electronic copying machine of this type can perform automatic copying continuously for a document having a plurality of sheets since an automatic document feeder (ADF) is provided. In this case, copying conditions such as the copying sheet number and the paper size are set, paper of the specified size is fed, and automatic copying is continuously performed. However, in this electronic copying machine, the paper size cannot be changed automatically in the continuous automatic copying. Further, in the continuous automatic copying, changes in an outfeed position of a sorter, pauses, and changes in copying modes to enlarged or reduced mode are not automatically performed. In other words, when a document is constituted by a plurality of sheets, different copying conditions cannot be selected for each part of the document which is copied in the continuous automatic copying.

A copying machine of the prior art is disclosed in Japanese Laid-Open Patent Application No. 54-4452 (corresponding U.S. Pat. No. 4,196,476). This patent proposes that in a copying machine having a plurality of programs for performing various controls of the copying machine, the user may selectively access some programs while a trained service personnel may access all the programs, and the number of programs may be increased or decreased.

SUMMARY OF THE INVENTION

The present invention has been made to eliminate the drawbacks of the prior art as described above and has for its object to provide a control device of a copying machine in which different copying conditions are set for respective parts of a document having a plurality of sheets. The different copying conditions are stored in a memory structure, and each of the copying conditions is sequentially read out from the memory structure when the copying sheet number for each part reaches. Therefore, when a document having a plurality of sheets is automatically continuously copied, different copying conditions are selected and automatically specified for each part of the document, increasing the copying efficiency.

In order to achieve the above and other objects of the present invention, there is provided a control device of a copying machine wherein said control device is capable of actuating a plurality of processing components, including an automatic document feeder, a semi-automatic document feeder and a sorter, to continuously perform automatic copying with time sequence, comprising:

(A) structure for setting copying conditions, including selection between said automatic document feeder and said semi-automatic document feeder, and a copying sheet number, based on the copying conditions;

(B) memory structure for storing the copying conditions and the copying sheet number set by said setting structure in correspondence with each other;

(C) structure for judging if the number of copies produced has reached the copying sheet number which is stored in said memory structure; and (D) control structure for reading out a copying condition from said memory structure according to judging results obtained by said judging structure, and executing a copying operation based on the copying condition.

According to the control device of the copying machine of the present invention, different copying conditions are set for respective copying sheet numbers. Data of the different copying conditions are stored in the memory structure. When the number of copies produced reaches a copying sheet number which is stored in the memory structure, a next copying condition which is stored in the memory structure is read out so that a different mode of copying operation is initiated in the corresponding part of the document. For example, when a document having a plurality of sheets is continuously automatically copied, different copying conditions are set for respective parts of the document having a plurality of sheets so that different modes of copying operation are performed, increasing the copying efficiency greatly.

BRIEF DESCRIPTION OF THE DRAWINGS

Other objects and features of the present invention will be apparent from the following description taken in conjunction with the accompanying drawings in which:

FIGS. 1A and 1B schematically show the overall arrangement of an electronic copying machine with an automatic document feeder which functions as both a semi-automatic document feeder (SDF) and an automatic document feeder (ADF) wherein FIG. 1A is a side view of the electronic copying machine and FIG. 1B is a perspective view thereof;

FIG. 6 shows a memory map of a user's memory area in the RAM;

FIG. 7 is a view for explaining an example of program storage in the user's memory area of FIG. 6;

DETAILED DESCRIPTION OF THE PREFERRED EMBODIMENT

Figure 1A:
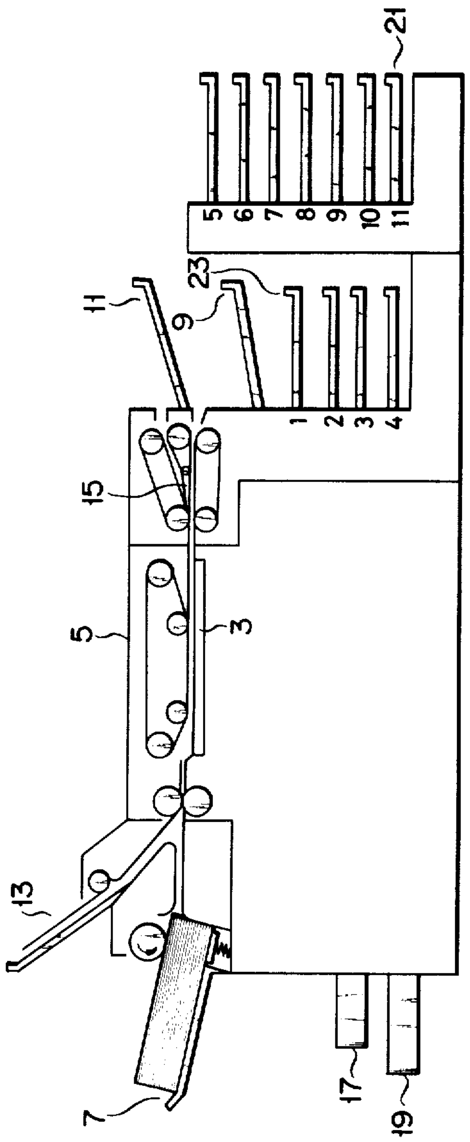
Figure 1B:
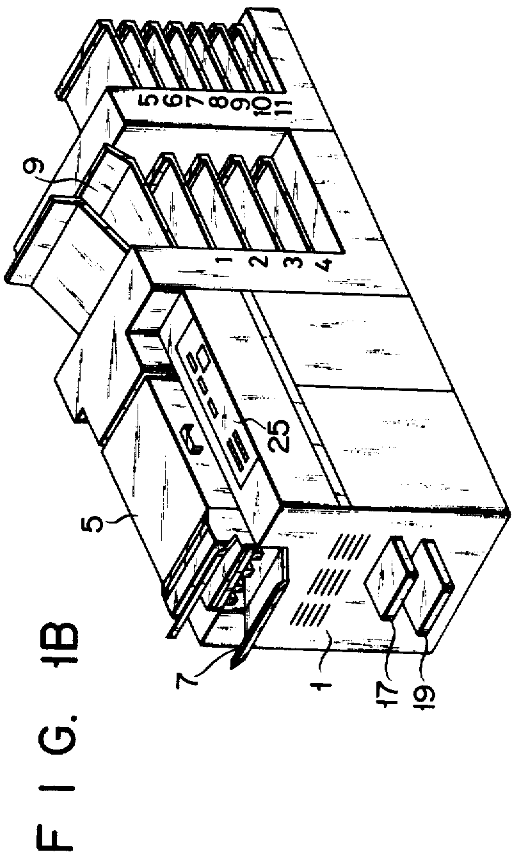
Figure 2:
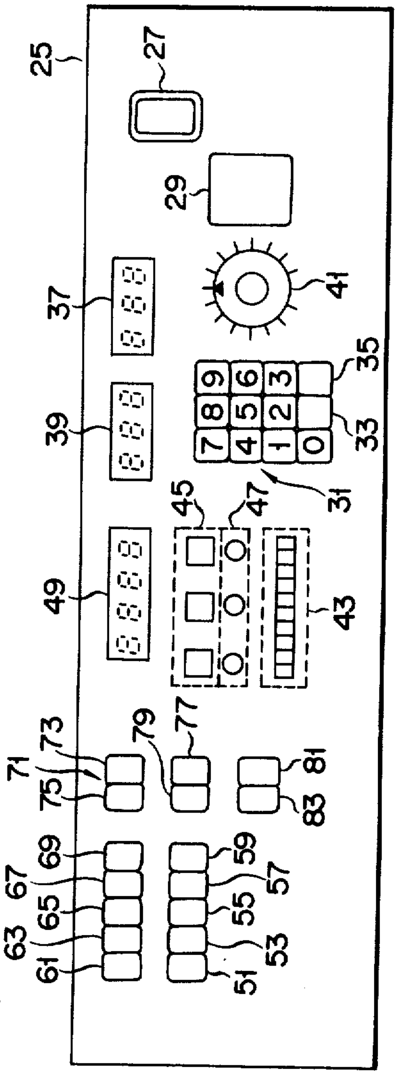
FIG. 2 is a plan view of a control panel of the electronic copying machine shown in FIG. 1.

FIG. 1 schematically shows the overall construction of an electronic copying machine with an automatic document feeder which functions as both a semi-automatic document feeder (SDF) and an automatic document feeder (ADF). A copying machine main body 1 has a copying machanism (not shown) therein. A document table 3 for receiving a document is arranged on the upper surface of the main body 1. Further, an automatic document feeder 5 which is free to open is mounted so as to cover the document table 3. When a document is inserted in a document tray 7 and a copying key to be described later is set to the on position, the automatic document feeder 5 automatically feeds the document to the document table 3. When exposure is completed, the document is automatically fed out to a first outfeed tray 9 or a second outfeed tray 11. The automatic document feeder 5 described above has both ADF and SDF functions, so that the document tray 7 for the ADF and a document tray 13 for the SDF are provided. The copying machine is further provided with a document gate 15 which switches the edge of the document to be fed out either to outfeed tray 9 for ADF or the outfeed tray 11 to SDF; first and second copy sheet cassettes 17 and 19; and first and second copy sheet outfeed trays 21 and 23. A copy sheet is fed either from the ADF document tray 7 or the SDF document tray 13 and the document to be copied is selectively fed out to either the first outfeed tray 9 or the second outfeed tray 11 in response to the operation of the document gate 15. A copy sheet is automatically fed either from the first copy sheet cassette 17 or the second copy sheet cassette 19. An image on the photosensitive drum is transferred and fixed on a copy sheet on the document table 3, and the copy sheet is fed out to a sorter which has the first copy sheet outfeed tray 21 and the second copy outfeed tray 23. Outfeed position numbers 1 to 11 are marked at the first and second copy sheet outfeed trays 21 and 23. One or more of the outfeed position members of the first copy sheet outfeed tray 21 or the second copy sheet outfeed tray 23 may be selected to receive copy sheets. The mode of selection will be described later. A control panel 25 is arranged on the front upper surface of the copying machine main body 1. As shown in FIG. 2, the control panel 25 is provided with a power switch 27, a copying key 29, numeric keys 31 for setting the number of copies and for entering other data, a correction key 33 for properly correcting the number of copies as needed and input data, an interrupt key 35 for performing interruption of copying, a preset sheet number display unit 37, a copying sheet number display unit 39 for displaying the current number of copies, a copying density control dial 41, a sheet amount display section 43, a paper size selection switch 45, a sheet size display section 47, and a data display unit 49 for displaying input data or time. The control panel 25 is further provided with a write switch 51 for writing a program (copying conditions), a memory switch 53 for storing the written data, a keycode input switch 55 for entering a keycode, a timer display switch 57 for displaying time, a jam position display switch 59 for displaying the position where a sheet of paper is jammed, a writing lamp 61 for indicating the period for which writing is performed, a data memory lamp 63 for indicating storage of data, a code key lamp 65 for indicating the status in which a keycode can be received, a timer display lamp 67 for indicating that timer display is performed, a jam position display lamp 69 for indicating that the jam position is displayed, and a status display section 71. The status display section 71 is constituted by a copy lamp 73 for indicating the status in which copying can be performed, a jam lamp 75, a paper supply lamp 77, a toner supply lamp 79, a manual mode lamp 81, and an abnormal exposure lamp 83. When the jam lamp 75 is turned on, the jam position display switch 59 is turned on to turn on the jam position display lamp 69. The jam position is displayed on the data display unit 49 with letters.

Figure 3:
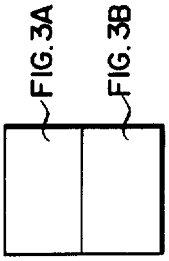
FIG. 3, are block control device of the electronic copying machine shown in FIG. 1.
Figure 3A:
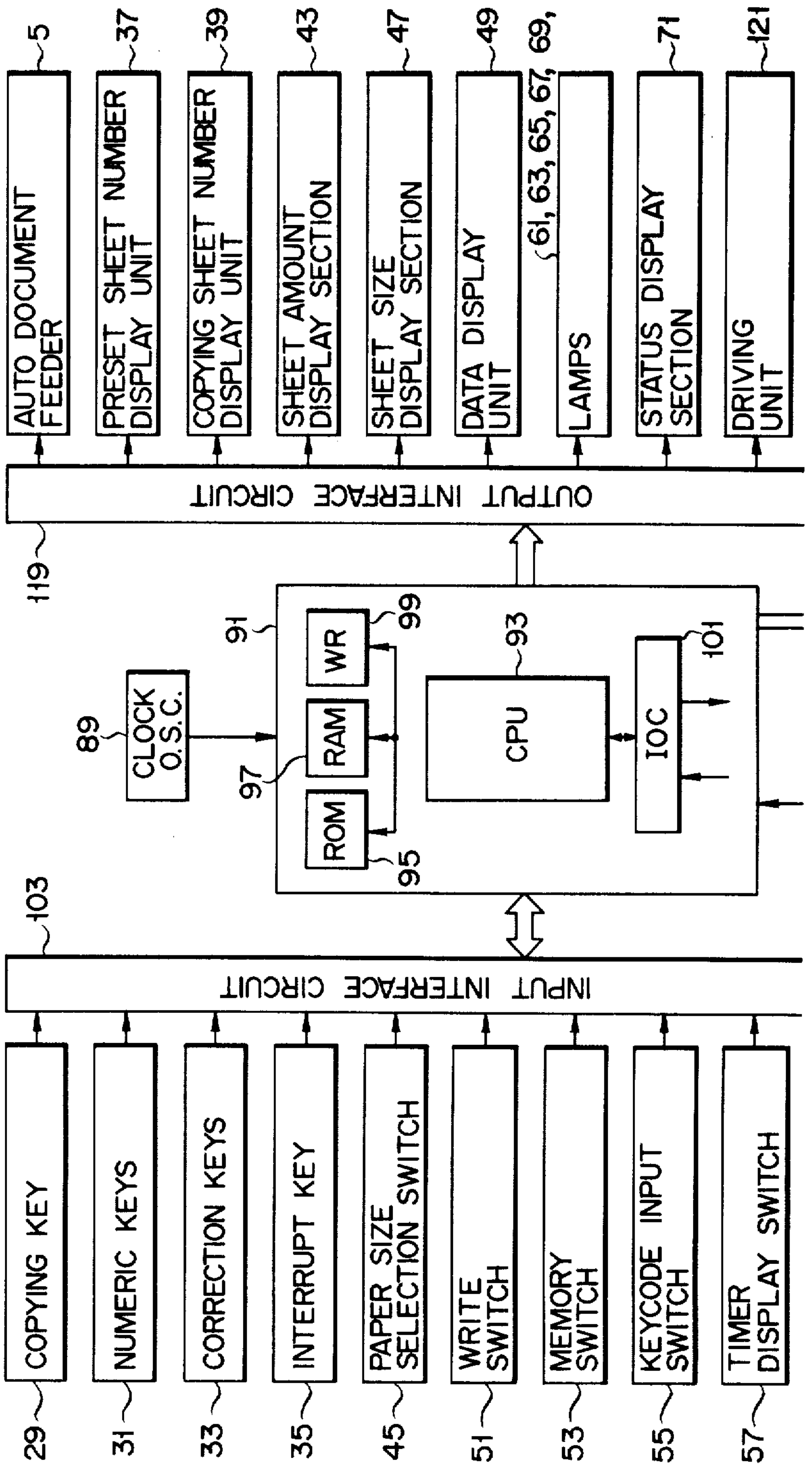
FIGS. 3A and 3B, making up
Figure 3B:
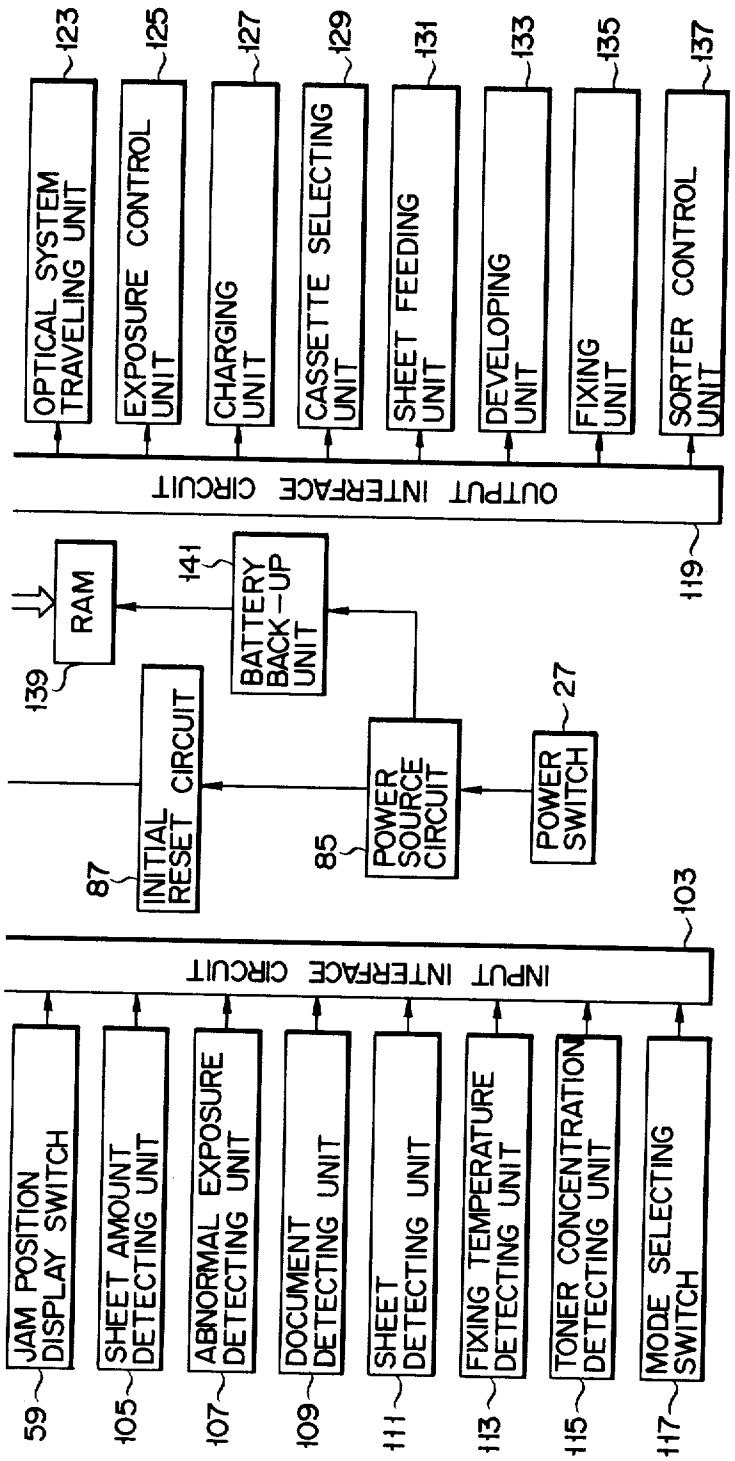

FIGS. 3A and 3B are block diagrams of the control device of the electronic copying machine described above. A power source circuit 85 supplies control power to each unit when the power switch 27 is turned on.

An initial reset circuit 87 operates when the power is supplied from the power source circuit 85, and sets each unit at the initial status. A clock oscillator 89 generates clock pulses to determine timings of various operations.

A microprocessor 91 has a central processing unit (CPU) 93, a read-only memory 95 for storing a control program, a random access memory (RAM) 97 for storing the program (copying conditions) and other data, a working register (WR) 99 for temporarily holding data, and an input/output control unit (IOC) 101 for controlling input and output devices. The microprocessor 91 executes a specified instruction in response to a clock pulse generated by the clock oscillator 89. An input interface circuit 103 receives input data from each switch and converts the data to digital data. This digital data is supplied to the microprocessor 91. To the input interface circuit 103 are connected the copying key 29, the numeric keys 31, the correction key 33, the interrupt key 35, the paper size selection switch 45, the write switch 51, the memory switch 53, the keycode input switch 55, the timer display switch 57, and the jam position display switch 59. To the input interface circuit 103 are also connected a sheet amount detecting unit 165 for detecting the amount of copying sheets in the first and second copy sheet cassettes 17 and 19, an abnormal exposure detecting unit 107 for detecting an abnormality at the exposure section, a document detecting unit 109 for detecting the position of the document, a sheet detecting unit 111 for detecting the position of the copying sheet to be fed, a fixing temperature detecting unit 113 for detecting the temperature of the fixing unit, a toner concentration detecting unit 115 for detecting the toner concentration of the developing unit, and a mode selecting switch 117 for selecting a control mode (refer to FIG. 5 for further details on a normal copying mode, a key counter mode, a RAM read mode I, a RAM read mode II, and a RAM write mode). The mode selecting switch 117 is arranged so as to be operated only by a service person.

Figures 4, 5:
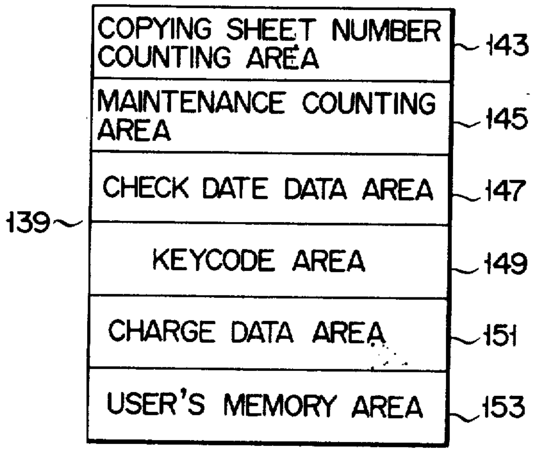
FIG. 4 shows a memory map of a RAM of FIG. 3.
FIG. 5 shows a relation between a status of a mode selecting switch and a control mode of copying machine of the mode selecting switch.

On the other hand, an output interface circuit 119 supplies a control signal to each unit in response to an output from the microprocessor 91. To the output interface circuit 119 are connected the automatic document feeder 5, the preset sheet number display unit 37, the copying sheet number display unit 39, the sheet amount display section 43, the sheet size display section 47, the data display unit 49, the various lamps 61, 63, 65, 67, and 69, and the status display section 71. To the output interface circuit 119 are also connected a driving unit 121 for driving a paper feeder system (not shown) and a photosensitive drum (not shown), an optical system traveling unit 123 for moving parts of the optical system such as an exposure lamp, an exposure control unit 125 for controlling the amount of light from the exposure lamp, a charging unit 127 for charging the photosensitive drum or transferring the image, a cassette selecting unit 129 for selecting a sheet cassette, a sheet feeding unit 131 for feeding a sheet from the sheet cassette, a developing unit 133, a fixing unit 135, and a sorter control unit 137 for specifying the outfeed direction of the copied sheet. A random access memory (to be referred to as a RAM hereinafter) 139 which stores program data or the like is connected to the microprocessor 91. This RAM 139 is arranged as a nonvolatile memory in which contents of the memory are retained by a battery back-up unit 141 even when the power switch 27 is turned off. The battery back-up device 141 need not be used, depending on the type of the RAM 139. The areas of the RAM 139 are allocated as shown in FIG. 4. Allocated are a copying sheet number counting area 143, a maintenance counting area 145 for checking degradation and fatigue of the photosensitive drum, cleaning brush, and developer, a check date data area 147 for storing date data of inspection made by the service person, a keycode area 149 for storing a keycode of the user, a charge data area 151 for storing data of the copying charge in accordance with the number of copies, and a user's memory area 153 for storing program data set by the user.

The areas 143, 145, 147 are further allocated as shown in FIG. 15. The copying sheet number counter area 143 is, for example, allocated into an address 0 where data of lower two digits 331 of the four digits in the number of copies is stored, an address 1 where data of "hundred" and "thousand" digits 333 of the four digits is stored, and an address 2 where data of the upper two digits 335 of the four digits is stored. The maintenance counting area 145 is allocated into an address 3 where data of the two lower digits 337 of the four digits in the number of copies is stored, an address 4 where data of the "hundred" and "thousand" digits 339 of the four digits is stored, and an address 5 where data of the upper two digits 34 of the four digits is stored. Furthermore, the check date data area 147 is allocated into an address 6 where data of "year" 343 is stored, an address 7 where data of "month" 345 is stored, and an address 8 where data of "date" 347 is stored.

Figure 9:
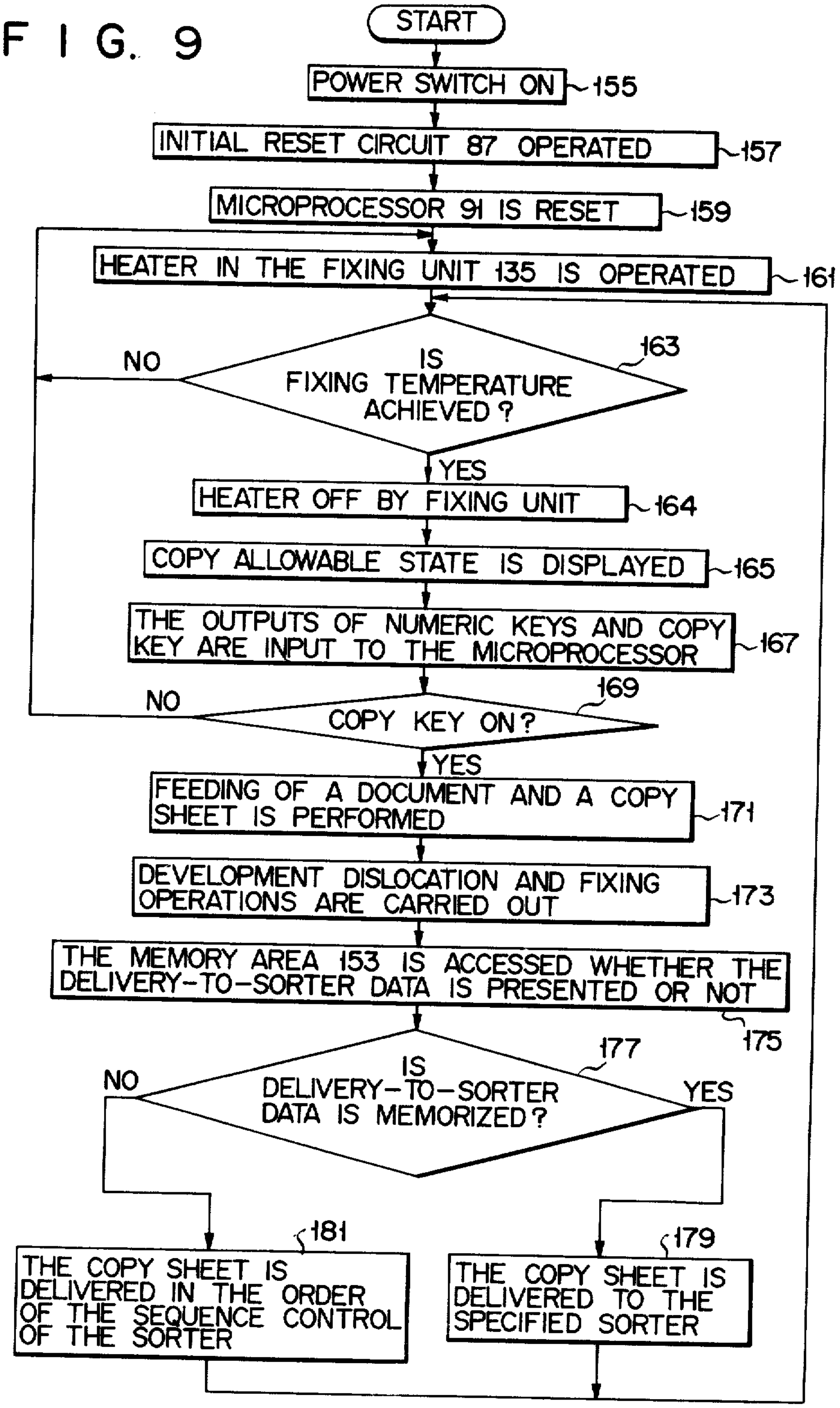
FIG. 9 is a flow chart for explaining the overall mode of operation of the control device of the electronic copying machine according to the present invention.

Along with this allocation of the memory contents, the mode of the overall operation will be briefly described with reference to a flow chart in FIG. 9. In step 155, when the power switch 27 is turned on, the power is supplied from the power source circuit 85 to each unit. The initial reset circuit 87 is then operated as shown in step 157. As a result, the microprocessor 91 is set in the initial status in step 159. The microprocessor 91 sequentially executes operations specified by instructions in response to clock pulses from the clock oscillator 89. First, in step 161, a heater of the fixing unit 135 is operated when an output is supplied from the microprocessor 91 thrugh the output interface circuit 119. A temperature of the fixing unit 135 is detected by the fixing temperature detecting unit 113. A detecting signal is supplied to the microprocessor 91 through the input interface circuit 103. Therefore, in step 163, the microprocessor 91 judges whether the detected temperature reaches a level at which fixing can be performed or not. As a result, when the detected temperature reaches the level at which fixing can be performed, in step 164, the heater of the fixing unit 135 is turned off. Subsequently, in step 165, an output is supplied from the microprocessor 91 through the output interface circuit 119 to turn on the copy lamp 73 which indicates that the copying operation is ready. In step 167, the numeric keys 31 and the copying key 29 are set in the condition in which the keys are ready to operate. On the other hand, when the detected temperature does not reach the level at which fixing can be performed, the heater of the fixing unit 135 is reheated by returning the program to step 161. In the state in which numeric keys 31 and the copying key 29 are ready to operate, when the copying key 29 is depressed, the microprocessor 91 which receives a signal from the copying key 29 outputs a signal to operate the driving unit 121, the cassette selecting unit 129, the sheet feeding unit 131 and so on. In step 171, copy sheets are supplied from the first and second copy sheet cassettes 17 and 19. When the sheet detecting unit 111 detects that the sheets supplied from the copy sheet cassettes 17 and 19 have reached the predetermined position, the sheet detecting unit 111 outputs a signal to the microprocessor. When the microporcessor 91 receives this signal, the microprocessor 91 then outputs a signal, in step 173, to operate the automatic document feeder, the optical system traveling unit 123, the exposure control unit 125 and the charging unit 127. More particularly, a document is first supplied by the automatic document feeder. At this time, the microprocessor 91 receives a detecting signal from the document detecting unit 109 through the input interface circuit 103. When the microprocessor 91 judges that the document is completely fed, the optical system traveling unit 123, the exposure control unit 125 and the charging unit 127 start operating so that exposure of the photosensitive drum is initiated. Thereafter, the known sequential operations of developing, transferring and fixing are performed. When the sheet to which an image on the photosensitive drum is tranferred is fed to the fixing unit 135, the sheet detecting unit 111 outputs an outfeed signal. This outfeed signal is supplied to the microprocessor 91 through the input interface circuit 103. In step 175, the microprocessor 91 refers to data within the user's memory area 153 of the RAM 139. Subsequently, in step 179, the microprocessor 91 specifies the outfeed position of the sheet to the sorter control unit 137. However, when the corresponding data is not stored in the user's memory area 153 of the RAM 139, in step 181, the outfeed position is determined by a sequence control of the sorter control unit 137. Thereafter, the same procedure is repeated by returning to step 163. During the return period from step 171 to step 163, that is, the period for which the copying key 29 is turned on, the microprocessor 91 receives the detected signal from the fixing temperature detecting unit 113 and supplies a signal to turn on/off the heater (not shown) of the fixing unit 135 at intervals with which the microprocessor 91 may not interrupt an operation in each step.

Figure 10A:
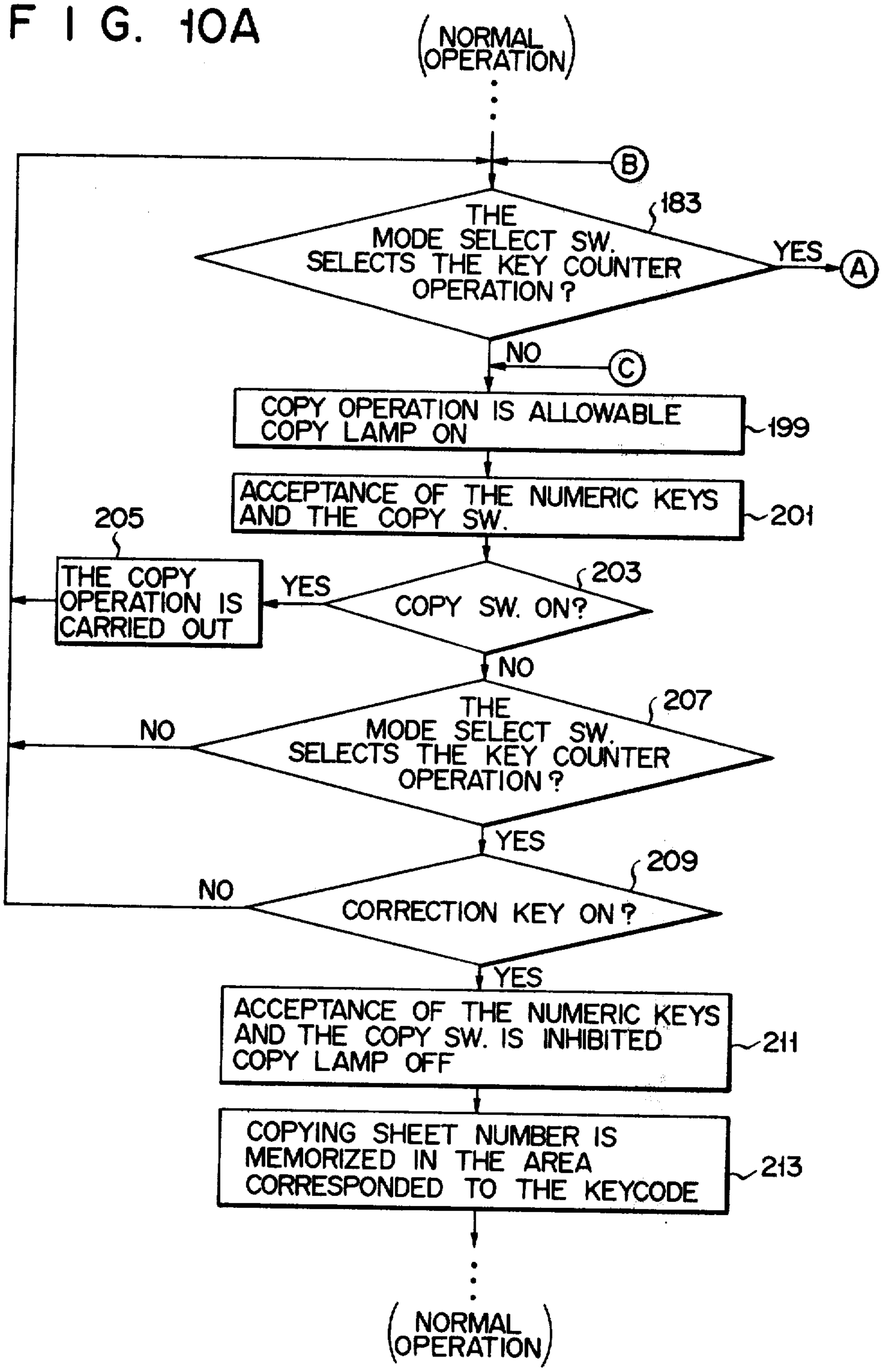
FIGS. 10A and 10B are flow charts for explaining the mode of operation of the copying machine when a key counter operation is performed.
Figure 10B:
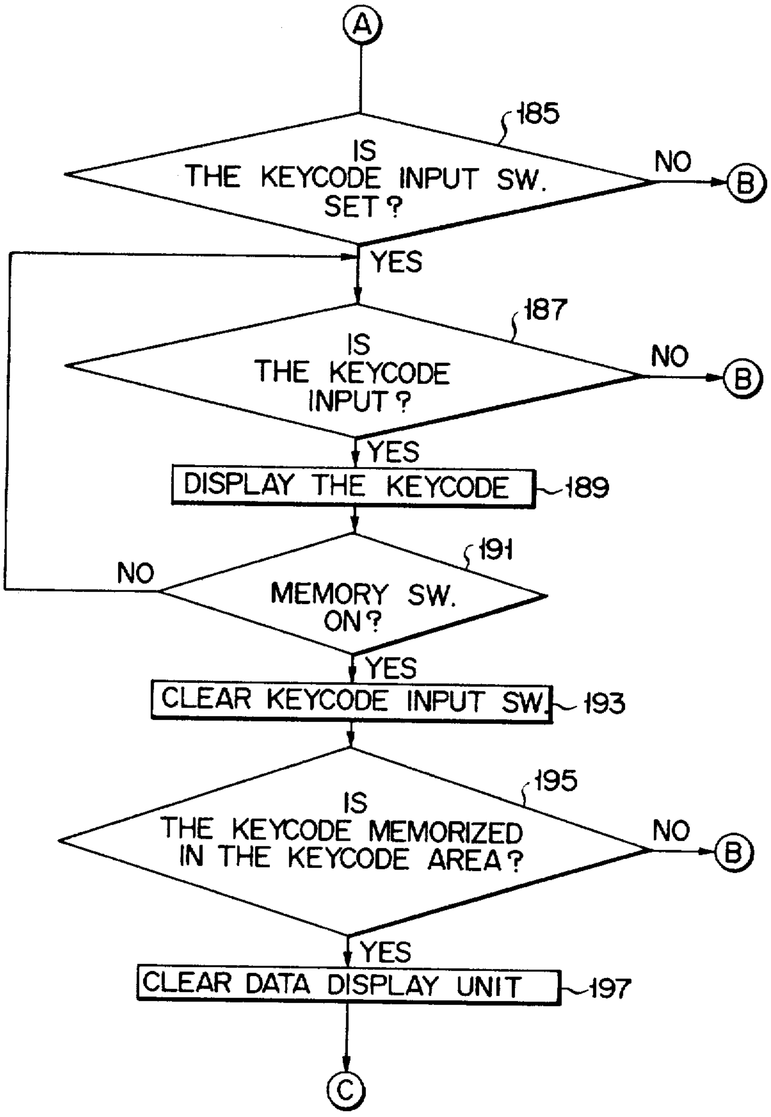

The way of application of a program by the RAM 139 to the electronic copying machine, which is the characteristic feature of the present invention, will be described in detail. The key counter operation of the copying key may be performed by the mode selecting switch 117. Therefore, unless the user inputs a particular keycode, the copying operation is not initiated. This mode of operation will be described below with reference to the flow charts in FIGS. 10A and 10B. First, in step 183, it is judged whether or not the mode selecting switch 117 selects the key counter operation. If this operation is not selected, the program returns to the step 183. On the other hand, if the key counter operation is selected, the program advances to step 183. It is then judged whether the keycode input switch 55 is set or not. In step 187, it is then checked whether or not a key code of 4 digits is input with the numeric keys 31. If the key code is not input, the program returns to step 183. On the other hand, if the keycode is input, in step 189, the keycode is displayed at the data display unit 49. Subsequently, in step 191, it is checked if the memory switch 53 is turned on. If the memory switch 53 is not turned on, the program returns to step 187. If the memory switch 53 is turned on, the microprocessor 91, in step 193, clears the keycode input switch 55. In step 195, the microprocessor 91 compares the keycode which is stored in advance in the keycode area 149 of the RAM 139 and the displayed contents of the data display unit 49. If the compared results do not coincide, the program returns to step 183. If they coincide, in step 197, the displayed contents are cleared at the data display unit 49 in order to keep secret of the keycode. The microprocessor 91 then sets the copying machine in the copying allowable state in step 199. Further, in step 201, the numeric keys 31 and the copying key 29 are set in the operative condition. In this condition, if the copying key 29 is depressed, depression of the copying key 29 is detected in step 203 and the copying operation is performed in step 205. On the other hand, when it is judged that the copying key 29 is not depressed in step 203, it is then checked if the mode selecting switch 117 selects the key counter operation in step 207. If the key counter operation is selected, it is then checked if the correction key 33 is depressed in step 209. In this embodiment, the initial state of the key counter operation is restored by turning on the correcion key 33. If the correction key 33 is not depressed, the program returns to step 183. On the other hand, if the correction key 33 is depressed, the numeric keys 31 and the copying key 29 are inhibited in step 211, so that the copy lamp 73 goes off. In step 213, the microprocessor 91 calculates the number of copies which are currently specified by using the corresponding keycode. The calculated results are related to the corresponding keycodes in one-to-one correspondence. The calculated results are then stored in the keycode area 149 of the RAM 139. As a result, until a new keycode is entered, the copy lamp 73 remains off and the copying key 29 remains inoperative.

As long as the mode selecting switch 117 is set at the normal copying mode and the copy lamp 73 is in the on state, the copying key 29 remains in the operative condition. The mode selecting switch 117 generates a binary code of 3 bits as shown in FIG. 5. A desired control mode of the copying machine is selected from five kinds of modes by the binary code. Referring to FIG. 5, when a mode "1" is selected, the binary code of "000" is generated to initiate the normal copying mode. The normal copying mode is a mode in which normal copying operation described above is performed. When a mode "2" is selected, the binary code of "001" is generated to initiate the key counter mode. This key counter mode is a mode in which the key counter operation described above is performed. Further, when a mode "3" is selected, the binary code of "010" is generated to initiate the RAM read mode I. When a mode "4" is then selected, the binary code of "011" is generated to initiate the RAM read mode II. When a mode "5" is selected, the binary code of "100" is generated to initiate the RAM write mode. The RAM read mode I and the RAM write mode initiate reading out and writing of the areas 143 to 151 except for the user's memory area 153 of the RAM 139. The RAM read mode II initiates reading out and writing of the user's memory area 153.

Figure 11A:
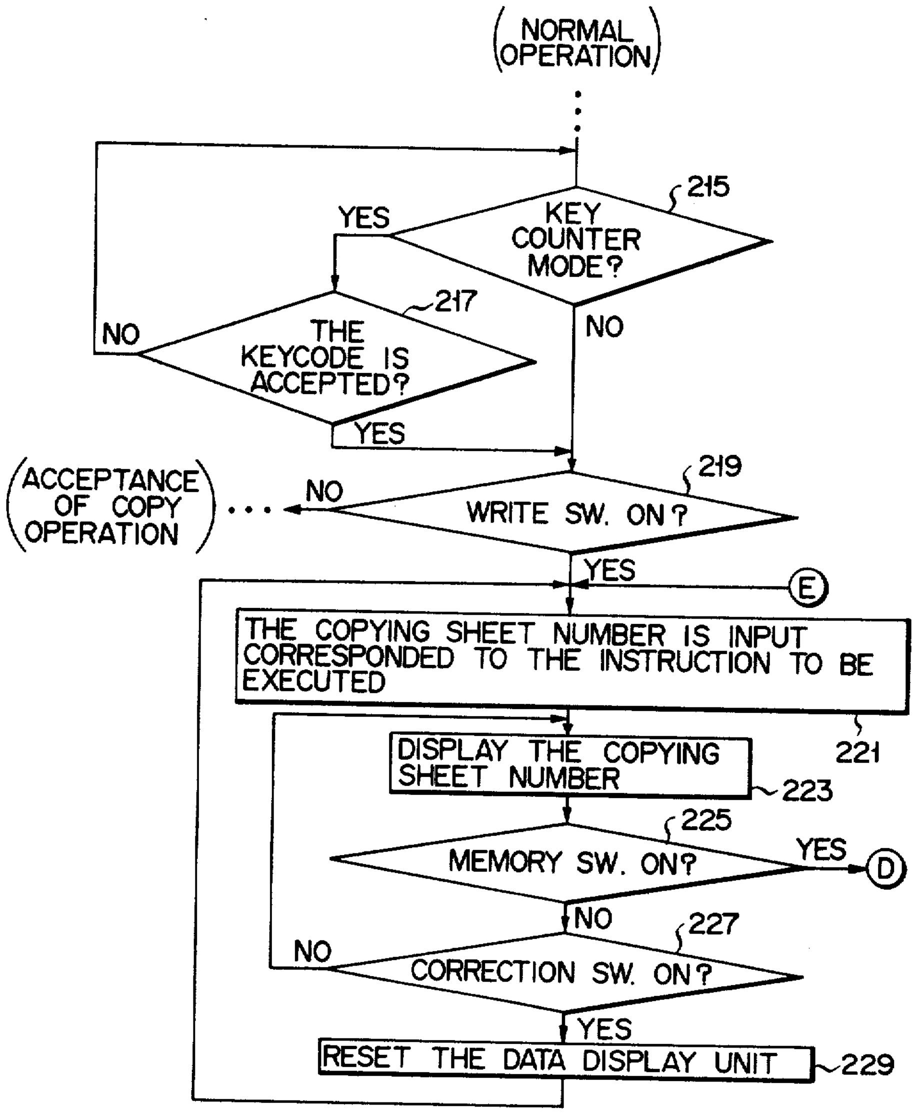
FIGS. 11A and 11B are flow charts for explaining sequential operations of writing a program in the user's memory area of the RAM.
Figure 11B:
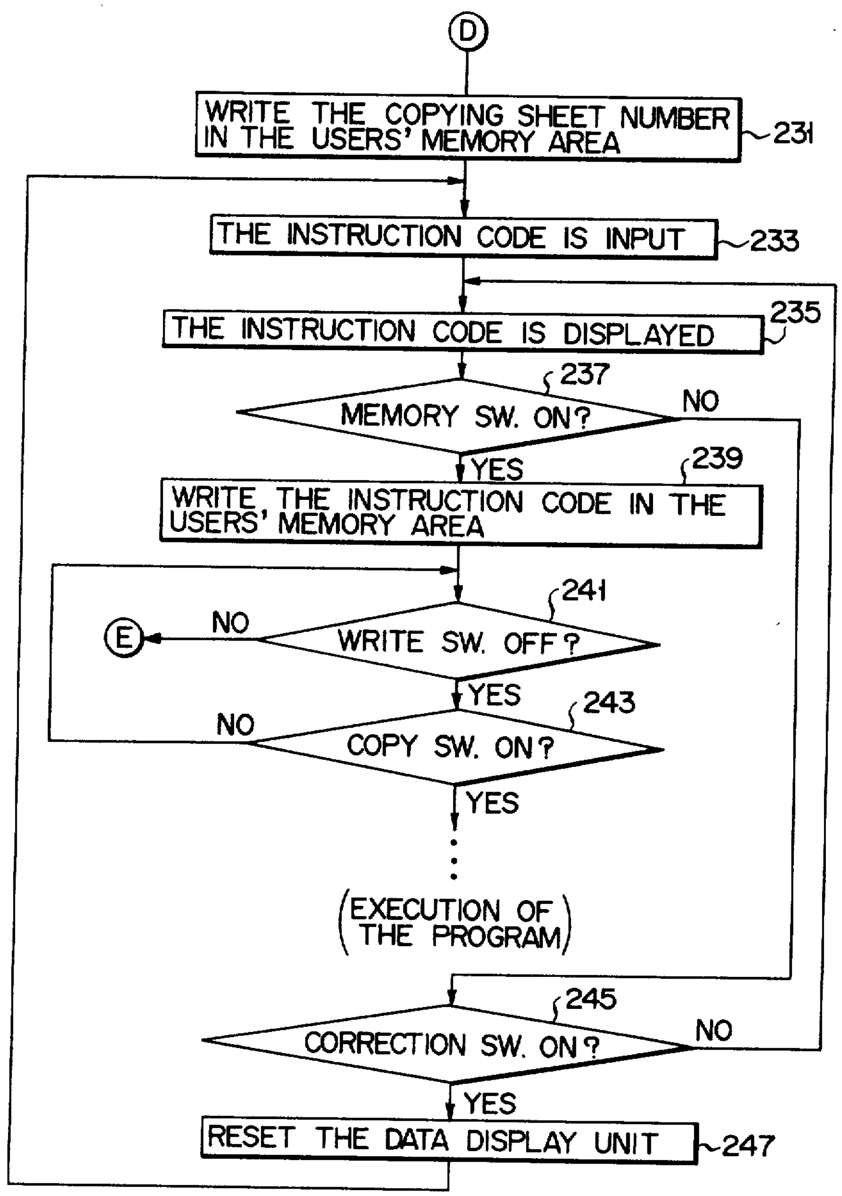

The sequential operations of writing a program (copying conditions) in the RAM 139 by the user will be described with reference to FIGS. 11A and 11B.

When the mode selecting switch 117 is set in the normal copying mode or the key counter mode, the user can perform a desired wirting operation of a program. However, a program can be written in the normal copying mode when the power switch 27 is turned on, while a program can be written in the key counter mode when a keycode is input.

First, in step 215, it is judged if the key counter operation is initiated. If the key counter operation is initiated, it is checked in step 217 if a keycode is input. If the keycode is input, and if the normal copying mode is initiated, it is then checked if the write switch 51 is turned on in step 219. When the write switch 51 is turned on, in step 221, the contents (copying conditions) of a program are entered with the numeric keys 31. The stored contents are displayed at the data display unit 49. Subsequently, in step 225, it is checked if the memory switch 53 is turned on. When the memory switch 53 is turned on, in step 231, the microprocessor 91 writes the displayed contents at the data display unit 49 in the user's memory area 153 of the RAM 139. In step 233, an instruction code is then input. In step 235, the instruction code is displayed. When it is judged, in step 239, that the memory switch 53 is turned on, the instruction code is written in the user's memory area 153. In this case, each program is constituted by the number of copies represented by decimal notation of 3 digits at maximum and an instruction code represented by decimal notation of 4 digits.

Further, in step 241, when the write switch 51 is turned on, steps 221, 223, 225, 231, 233, 235, 237, and 239 are repeated and another program is then written. When the number of copies are erroneously keyed in, the correction key 33 is turned on. As a result, in step 227, it is judged that the correction key 33 is turned on. In step 229, the displayed contents of the data display unit 49 are reset, and the program returns to step 221. The number of copies is then properly keyed in. In a similar manner, when the instruction code is erroneously keyed in, the correction key 33 is depressed to turn it on. The operative state of the correction key 33 is detected in step 245. In step 247, the displayed contents at the data display unit 49 are cleared. The program then returnes to step 233. Therefore, an instruction code may be keyed in again. The number of copies is the same as the displayed content of the copying sheet number display unit 39. This unit 39 displays the number of copied sheets of the total setting number of copies. The copying sheet number display unit 39 counts up the number of copied sheet every time a copy sheet is fed. However, before a copy sheet is fed, that is, before selected data is supplied to the cassette selecting unit 129, an instruction which indicates the number of copies including the next copy, that is, the number of copies which the displayed number of the copying sheet display unit 39 and "1" are the total, is already executed.

Figure 12:
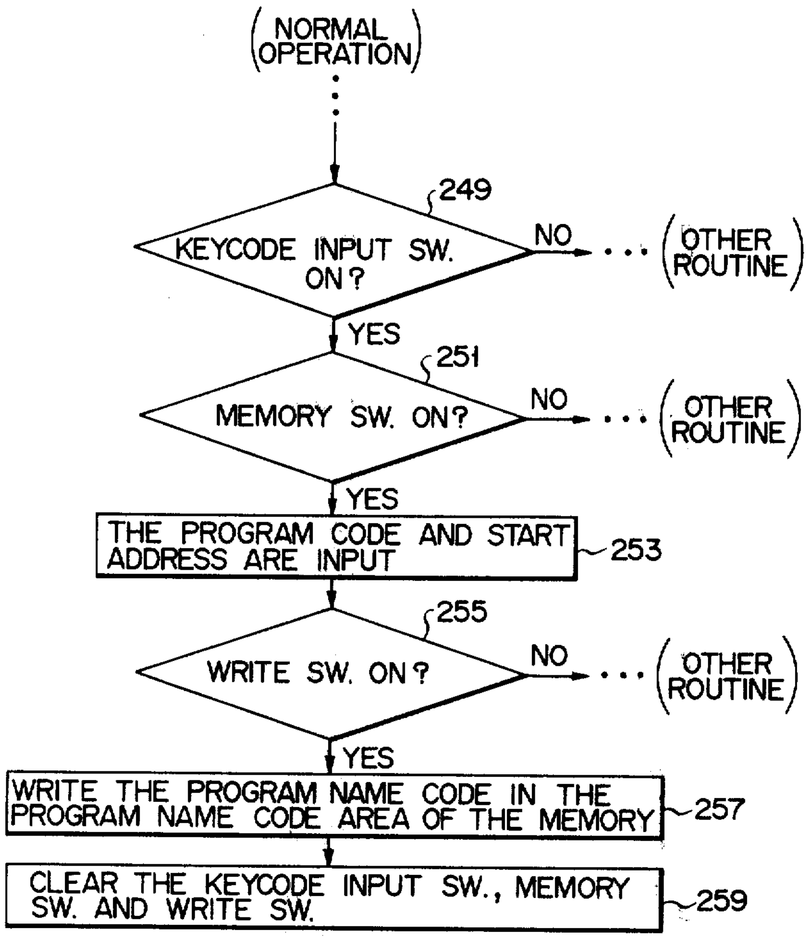
FIG. 12 is a flow chart for explaining sequential operations of adding a program name code to the program written according to the flow charts in FIGS. 11A and 11B.

A program name may be added to the above program. In the flow chart shown in FIG. 12, the key code input switch 55 is turned on in step 249. In step 251, the memory switch 53 is turned on. Subsequently, in step 253, a program name code and a start address are input. When the write switch 51 is turned on, the on state of the write switch 51 is detected in step 255. As a result, in step 257, the program name code is stored in a program name code area of the user's memory area 153. Subsequently, in step 259, the key code input switch 55, the memory switch 53, and the write switch 51 are cleared.

Figure 13:
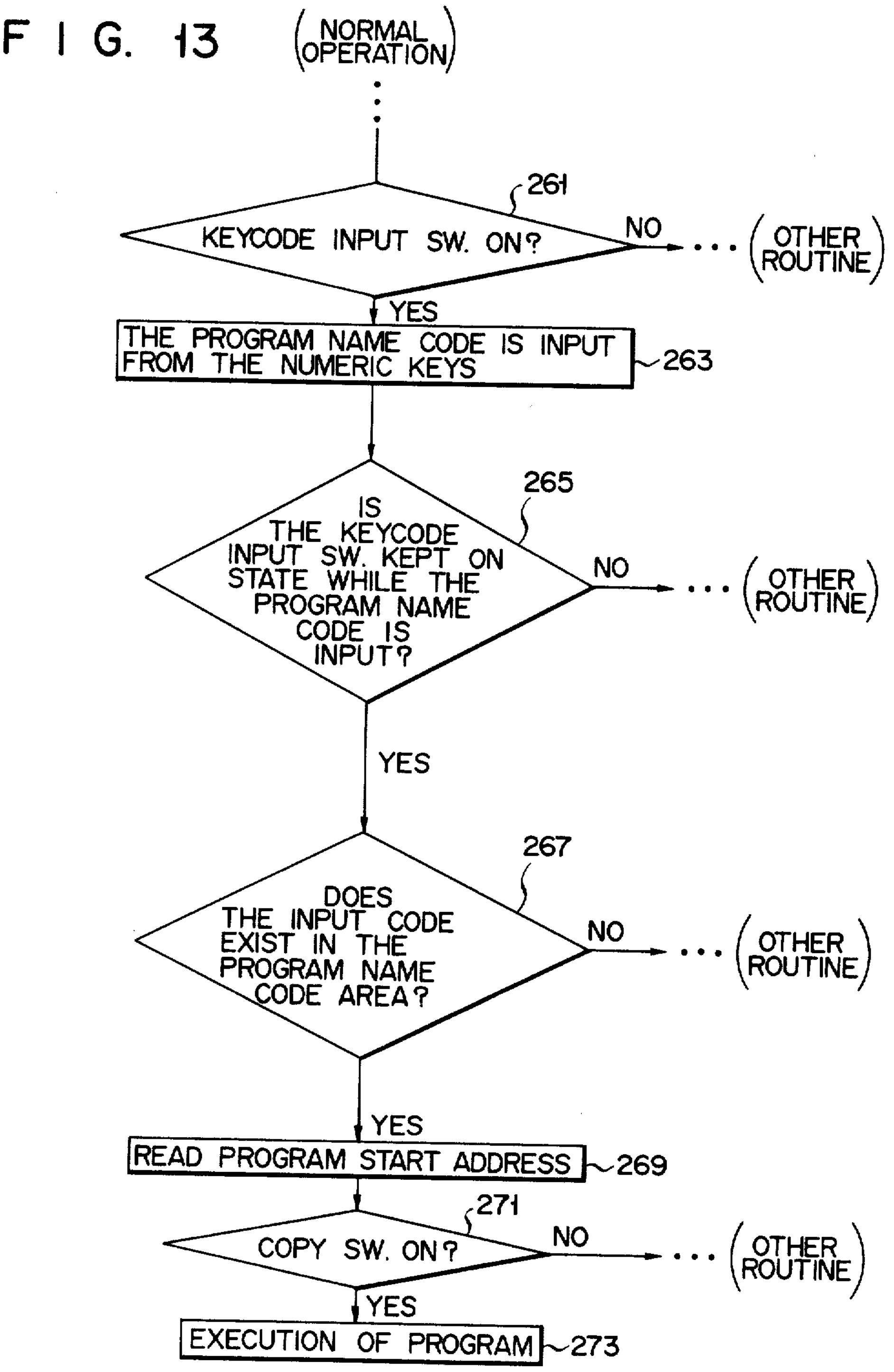
FIG. 13 is a flow chart for explaining sequential operations of accessing the program name code written according to the flow chart in FIG. 12.

On the other hand, a program name code is entered with the numeric key 31 and the key code input switch 55 to read out the corresponding program. According to the flow chart in FIG. 13, it is checked, in step 261, if the key code input switch 55 is turned on. When the key code input switch 55 is turned on, the program name code may be entered with the numeric keys 31 in step 263. Further, in step 265, it is checked if the key code input switch 55 is kept on while the program name code is input. If the key code input switch 55 is continuously kept on, it is checked, in step 267, if the input program name code is present in the program name code area. If the input program name code is present there, the start address of the program is read out in step 269. Subsequently, in step 271, it is checked if the copying key 29 is turned on. If the copying key 29 is turned on, the copying operation in accordance with the selected program is performed in step 273. In order to cancel this program, the correction key 33 may be turned on. Otherwise, the program is completed when the set number of copies are all copied.

The contents of the program specified by the user are, for example, the copying conditions of a plurality of documents, such as selection of paper size, setting of exposure, setting of a copy sheet number and specification of an outfeed position of the sorter.

When the copying operation is performed while executing the program, an instruction code to be executed in the next copying cycle is set to be displayed at the data display unit 49.

The state of writing a program in the user's memory area 153 of the RAM 139 will be described with reference to FIG. 6. The user's memory area 153 is constituted by a program area 275 and a program address area 277. A plurality of programs may be stored in the program area 275, and each program is stored between a program start code 279 and a program end code 281. As has been described above, the instruction system is constituted by a copy sheet number 283 and an instruction code 285, and a plurality of instruction systems constitute a program which is stored between the program start code 279 and the program end code 281. A pair consisting of a program name code 287 and a start address (an address in which the start code is stored) 289 are stored in the program address area 277 in one-to-one correspondence. Respective addresses (l, l+1, l+2, l+3) of the program address area 277 are preset. When a desired program is accessed, the program name of this program is indexed from the program address area 277, and the start address 289 of this program is specified.

A program can be written in this condition. FIG. 7 shows an example of a sequence for writing a program. For example, for selecting a paper size A4 and specifying the number of copy sheets as h, data of a copying sheet number (h) 291 and an A4 size selection instruction code 293 are written. Alternatively, for selecting a paper size B5 and specifying the number of copy sheets as i, data of a copying sheet number (i) 295 and a B5 size selection instruction code 297 are written. Furthermore, for specifying the ADF or SDF when the number j of copy sheets are to be copied, a copying sheet number (j) 299 and an increase in exposure amount instruction code 301 are written. For specifying the number of copy sheets as k for part of a document constituted by a plurality of sheets, and if that part of the document is copied twice, data of a copying sheet number (k) 303 and a copy twice instruction code 305 are written. Finally, for specifying an outfeed position of the sorter for the number of copies l data of a copying sheet number (l) 307 and a delivery-to-sorter instruction code 309 are written. With a combination of the copying sheet number and the instruction code, the data of the copying sheet number is first written and the instruction code is then written.

A desired program is thus written in the user's memory area 153 of the RAM 139.

Figure 14:
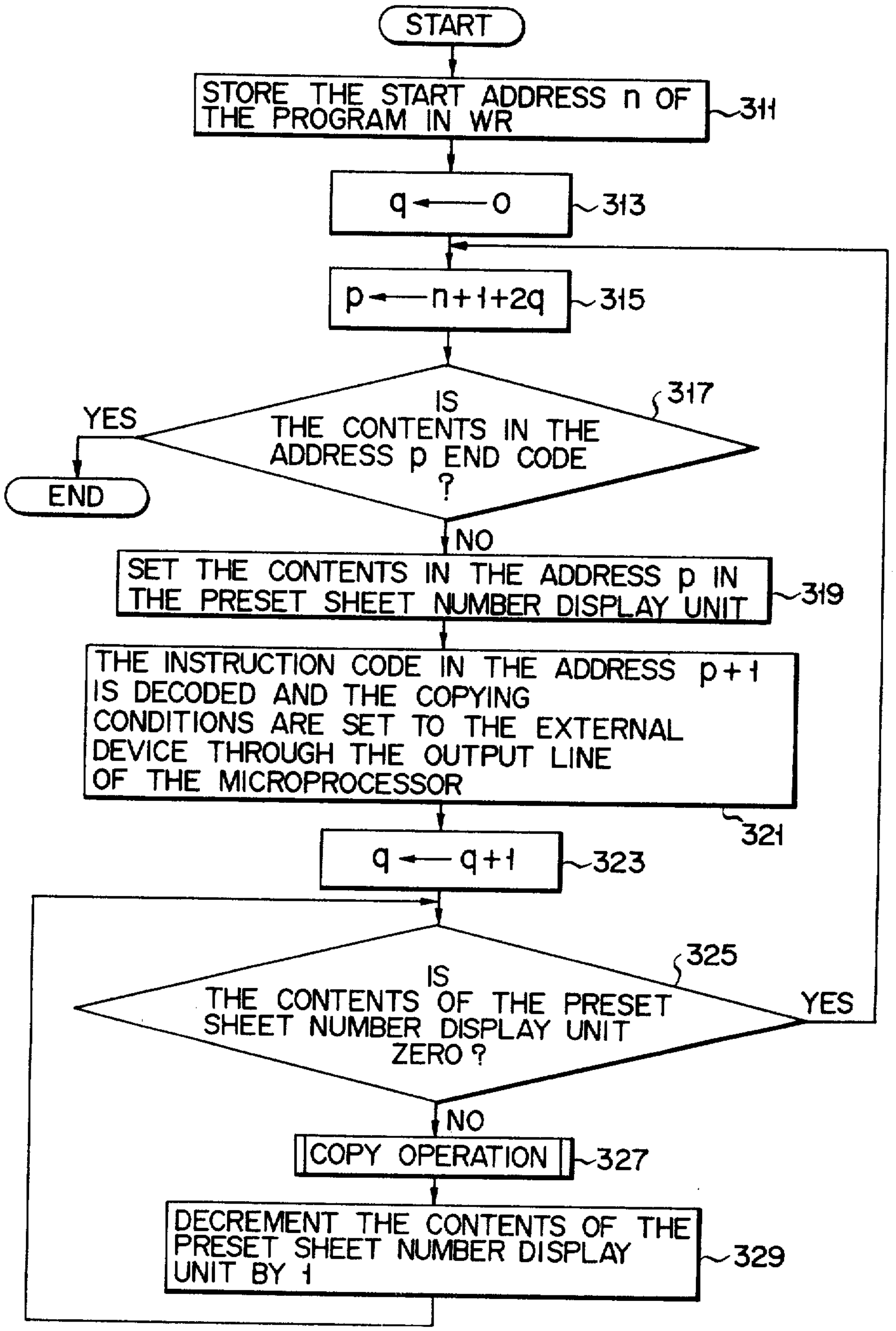
FIG. 14 is a flow chart for explaining sequential operations of a microprocessor when the program written in the user's memory area of the RAM is executed.

The control sequence of the microprocessor 91 which executes a program arranged as described above will be described with reference to the flow chart in FIG. 14. In step 311, a start address n of a program is stored in a working resistor WR99. In step 313, a counter q is reset to "0" or to the initial condition. In step 315, an address is calculated in accordance with the start address and the contents of the counter q. At first, the content of the counter q is "0" so that the (n+1)th address is calculated as address p. Subsequent addresses are incremented by 2 addresses to constantly calculate addresses in which the data of the number of copies are stored. In step 317, it is checked if the contents of the address p are the program end code. If the contents of the address p are not the end code, the contents of the address p are read out in step 319, and is set in the preset sheet number display unit 37. In step 321, the contents of the (P+1)th address, that is, the instruction code, are read out and decoded. Based on the decoded results, the copying conditions are set in an external device through an output line of the microprocessor 91. In step 323, it is checked if the contents of the preset sheet number display unit 37 are 0. If the contents are not 0, the copying operation is performed in step 327 and the contents of the preset sheet number display unit 37 are decremented by 1 in step 329. The program returns to step 325 and the copying operation is repeated until the contents of the preset sheet number display unit 37 become zero. When the contents of the preset sheet number display unit 37 become 0, the program returns to step 315 where the address p is calculated to perform the program operation in the same manner.

Figure 8:
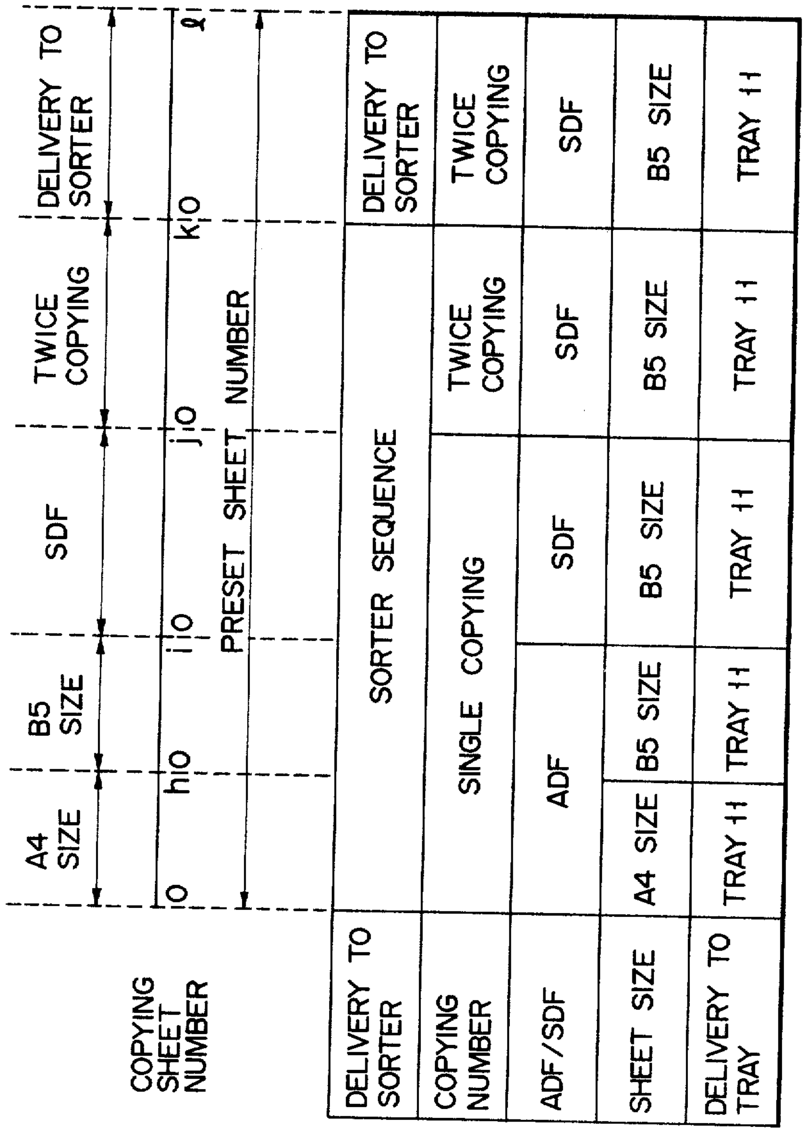
FIG. 8 shows detailed steps of execution of the program in FIG. 7.

FIG. 8 shows detailed steps of execution of the program in FIG. 7. The sequential copying operation is performed in such a manner that a first part of documents which numbers h sheets is copied with A4 size copy sheets, a second part of the documents which numbers l sheets is copied with B5 size copy sheets, a third part of the documents which numbers j sheets is copied with an increased amount of light, a fourth part of the documents which numbers k sheets is copied twice, and a fifth and last part of the documents which numbers l sheets is fed out to a specified tray of the sorter.

On the other hand, when the power remains on and after a series of copying operations such as copying by the key code operation, program copying, continuous copying, single copying and the like are completed, the copying machine is restored to the initial state. In this initial state, the SDF document tray 13 is used and the copying sheet number is 1. The outfeed position is selected in the order of the first to eleventh tray and the outfeed tray for the document is the second outfeed tray 11. For example, when the copying operation is not performed over a certain period of time even if an instruction code is entered with the numeric keys 31 and other modes are specified at the control panel, the copying machine is restored to the initial state as described above.

When the interruption copying mode is specified during the copying operation based on the copying conditions, the automatic document feeder is temporarily stopped and a document which is copied in the interruption mode is fed out to the SDF document tray 11. The produced copies may be fed out to unused tray of the sorter. Further, if no unused tray is present, the produced copy is fed out to the first tray of the sorter.

While the invention has been particularly shown and described with reference to a preferred embodiment thereof, it will be understood by those skilled in the art that various changes in form and details may be made therein without departing from the spirit and scope of the invention.

What is claimed is:

1. A control device of a copying machine wherein said control device is capable of actuating a plurality of processing components, including an automatic document feeder, a semi-automatic document feeder and a sorter, to continuously perform automatic copying with time sequence, comprising:

(A) means for setting copying conditions, including selection between said automatic document feeder and said semi-automatic document feeder, and a copying sheet number, based on the copying conditions;

(B) memory means for storing the copying conditions and the copying sheet number set by said setting means in correspondence with each other;

(C) means for judging if the number of copies produced has reached the copying sheet number which is stored in said memory means; and (D) control means for reading out a copying condition from said memory means according to judging results obtained by said judging means, and including means for executing a copying operation based on said read out copying condition.

2. A device according to claim 1, wherein said copying conditions includes copying modes such as enlarged copying, reduced copying and copying of equal size, selection of an output position of the sorter, and changes in paper sizes.

3. A device according to claim 1, said control means includes a programmable microprocessor connected to said setting means, said memory means and said judging means; said microprocessor including a central processing unit which receives an input signal for interruption copying and a read-only memory device which stores a permanent program; and said read-only memory device having a permanent program for said central processing unit, so that said control means may perform a specific operation in accordance with the program, whereby when the input signal for interruption copying is received, said automatic document feeder, said semi-automatic document feeder and said sorter are controlled to stop the document feeding of said automatic document feeder, to feed a document to be copied in the interruption copying mode by said semi-automatic document feeder and to specify to feed out a produced copy to a preselected section of said sorter.

* * * * *